(12) United States Patent
Richards et al.

(10) Patent No.: US 6,556,621 B1
(45) Date of Patent: Apr. 29, 2003

(54) SYSTEM FOR FAST LOCK AND ACQUISITION OF ULTRA-WIDEBAND SIGNALS

(75) Inventors: James L. Richards, Fayetteville, TN (US); Larry W. Fullerton, Brownsboro, AL (US); Ivan A. Cowie, Madison, AL (US); William D. Welch, Jr., Huntsville, AL (US); Randall S. Stanley, Madison, AL (US)

(73) Assignee: Time Domain Corporation, Huntsville, AL (US)

( * ) Notice: Subject to any disclaimer, the term of this patent is extended or adjusted under 35 U.S.C. 154(b) by 0 days.

(21) Appl. No.: 09/538,292

(22) Filed: Mar. 29, 2000

(51) Int. Cl.$^7$ ................................................ H04B 1/69
(52) U.S. Cl. ...................... 375/150; 375/256; 375/325; 375/367; 375/368
(58) Field of Search ................................ 375/150, 325, 375/365, 367, 368, 256

(56) References Cited

U.S. PATENT DOCUMENTS

| | | |
|---|---|---|
| 4,641,317 A | 2/1987 | Fullerton |
| 4,743,906 A | 5/1988 | Fullerton |
| 4,813,057 A | 3/1989 | Fullerton |
| 4,979,186 A | 12/1990 | Fullerton |
| 5,337,054 A * | 8/1994 | Ross et al. ..................... 342/93 |
| 5,363,108 A | 11/1994 | Fullerton |
| 5,420,850 A * | 5/1995 | Umeda et al. ................. 370/18 |
| 5,644,591 A * | 7/1997 | Sutton ......................... 375/200 |
| 5,677,927 A | 10/1997 | Fullerton et al. |
| 5,687,169 A | 11/1997 | Fullerton |
| 5,832,035 A | 11/1998 | Fullerton |
| 5,901,172 A | 5/1999 | Fontana et al. |
| 5,952,954 A | 9/1999 | Beckner |
| 5,952,956 A * | 9/1999 | Fullerton ..................... 342/27 |
| 5,966,090 A * | 10/1999 | McEwan ..................... 342/27 |
| 6,026,125 A * | 2/2000 | Larrick, Jr. et al. ......... 375/295 |
| 6,239,741 B1 * | 3/2001 | Fontana et al. ............. 342/135 |

OTHER PUBLICATIONS

U.S. patent application Ser. No. 09/537,264, Stanley et al., filed Mar. 29, 2000.
U.S. patent application Ser. No. 09/537,692, Fullerton et al., filed Mar. 29, 2000.
U.S. patent application Ser. No. 09/538,519, Fullerton et al., filed Mar. 29, 2000.
U.S. patent application Ser. No. 09/146,524, Richards et al., filed Sep. 3, 1998.
U.S. patent application Ser. No. 09/356,384, Jett et al., filed Jul. 16, 1999.
J.J. Stiffler, "Synchronization Techniques," in Digital Communications with Space Applications, edited by S.W. Golomb, 1964, pp. 135–160.
Marvin K. Simon et al., "Spread Spectrum Communications Handbook" McGraw–Hill, Inc., 1994, pp. 751–900.
M.Z. Win et al., "Impulse Radio: How It Works", IEEE Communications Letters, vol. 2, No. Feb. 1998, pp. 36–38.
A. Petroff et al., "Time Modulated Ultra–Wideband (TM–UWB) Overview", Wireless Symposium/Portable by Design Feb. 25, 2000, Abstract, pp. 1–10.
U.S. patent application Ser. No. 09/209,460, McCorkle et al. (no date available).

* cited by examiner

Primary Examiner—Stephen Chin
Assistant Examiner—Dac V. Ha
(74) Attorney, Agent, or Firm—Venable; Michael A. Sartori

(57) ABSTRACT

A system and method for detecting an impulse radio signal obtains a template pulse train and a received impulse radio signal. The system compares the template pulse train and the received impulse radio signal to obtain a comparison result. The system performs a threshold check on the comparison result. If the comparison result passes the threshold check, the system locks on the received impulse radio signal. The system may also perform a quick check, a sychronization check, and/or a command check of the impulse radio signal.

51 Claims, 14 Drawing Sheets

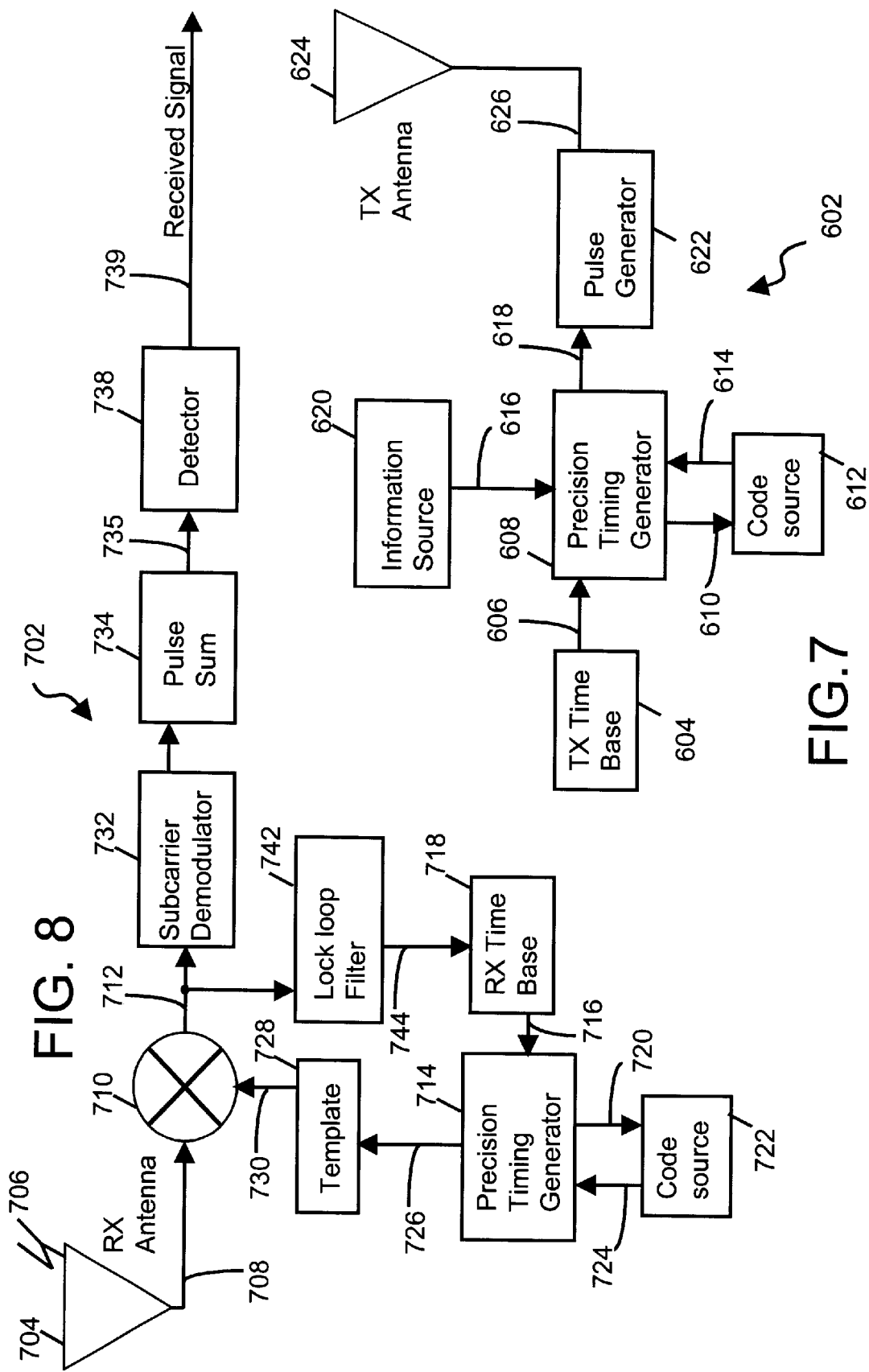

SYSTEM FOR FAST LOCK AND ACQUISITION OF ULTRA-WIDEBAND SIGNALS

BACKGROUND OF THE INVENTION

1. Field of the Invention

The invention relates to a system for detecting a signal and, more particularly, to a system for fast lock and acquisition of ultra-wideband signals.

2. Related Art

Recent advances in communications technology have enabled an emerging, revolutionary ultra-wideband technology (UWB) called impulse radio communications systems (hereinafter called impulse radio).

Impulse radio was first fully described in a series of patents, including the following, which are incorporated herein by reference: U.S. Pat. No. 4,641,317, issued Feb. 3, 1987 to Larry W. Fullerton; U.S. Pat. No. 4,813,057, issued Mar. 14, 1989 to Larry W. Fullerton; U.S. Pat. No. 4,979,186, issued Dec. 18, 1990 to Larry W. Fullerton; and U.S. Pat. No. 5,363,108, issued Nov. 8, 1994 to Larry W. Fullerton. A second generation of impulse radio patents include the following, which are incorporated herein by reference: U.S. Pat. No. 5,677,927, issued Oct. 14, 1997 to Fullerton et al.; U.S. Pat. No. 5,687,169 issued Nov. 11, 1997 to Fullerton et al.; and U.S. Pat. No. 5,832,035, issued Nov. 3, 1998 to Fullerton et al.

Use of impulse radio systems for vector modulation is described in the following, which is incorporated herein by reference: U.S. patent application Ser. No. 09/538,519, concurrently filed, entitled "Vector Modulation System for Wideband Impulse Radio Communications."

Basic impulse radio transmitters emit short pulses approaching a Gaussian monocycle with tightly controlled pulse-to-pulse intervals. Impulse radio systems typically use pulse position modulation, which is a form of time modulation where the value of each instantaneous sample of a modulating signal is caused to modulate the position of a pulse in time.

For impulse radio communications, the pulse-to-pulse interval is varied on a pulse-by-pulse basis by two components: an information component and a pseudo-random code component. Unlike direct sequence spread spectrum systems, the pseudo-random code for impulse radio communications is not necessary for energy spreading because the monocycle pulses themselves have an inherently wide bandwidth. Instead, the pseudo-random code of an impulse radio system is used for channelization, energy smoothing in the frequency domain, and interference suppression.

Generally speaking, an impulse radio receiver is a direct conversion receiver with a cross-correlator front end. The front end coherently converts an electromagnetic pulse train of monocycle pulses to a baseband signal in a single stage. The data rate of the impulse radio transmission is typically a fraction of the periodic timing signal used as a time base. Because each data bit modulates the time position of many pulses of the periodic timing signal, this yields a modulated, coded timing signal that comprises a train of identically shaped pulses for each single data bit. As an option, the impulse radio receiver can integrate multiple pulses to recover the transmitted information.

In a multi-user environment, impulse radio depends, in part, on processing gain to achieve rejection of unwanted signals. Because of the extremely high processing gain achievable with impulse radio, much higher dynamic ranges are possible than are commonly achieved with other spread spectrum methods.

When receiving an ultra-wideband signal as part of a one-way communication system (e.g., a pager) or a two-way communication system (e.g., a wireless telephone), a problem exists as to how to detect the transmitted impulse radio signal, and more particularly, how to acquire and lock on the impulse radio signal being transmitted. This problem exists independent of how the received ultra-wideband signal is used, such as in a one-way or two-way communication system.

Previous approaches to solving this problem are discussed in the following commonly owned patents, which are incorporated by reference: U.S. Pat. No. 5,832,035, issued Nov. 3, 1998 to Fullerton, and U.S. Pat. No. 5,677,927, issued Oct. 14, 1997. The present invention presents another approach to solving this problem.

SUMMARY OF THE INVENTION

An object of the invention is to provide a system for detecting an impulse radio signal.

An object of the invention is to provide a system for fast lock and acquisition of an impulse radio signal.

The above objects and advantages of the present invention are achieved by a method, a system, and an apparatus for fast lock and acquisition of ultra-wideband signals.

The method of the invention detects an impulse radio signal with the following steps: obtaining a template pulse train; obtaining a received impulse radio signal; comparing the template pulse train and the received impulse radio signal to obtain a comparison result; performing a threshold check of the comparison result; and locking on the received impulse radio signal. Additionally, the method can include performing a quick check using the template pulse train and additional received impulse radio signal. Further, the method can include performing a synchronization check of further received impulse radio signal. Moreover, the method can include performing a command check of command data of the impulse radio signal.

The apparatus of the invention includes an apparatus for implementing the method of the invention, and the system of the invention includes a system for implementing the method of the invention.

In one embodiment, the system of the invention detects an impulse radio signal and includes: an antenna; a cross-correlator; a pulse summer; a detector; a threshold comparator a lock loop filter; a controller; and a template pulse train generator. In addition, the system can include a synchronization data memory. Further, the system can include a command data memory.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same features.

FIG. 7 illustrates a representative impulse radio transmitter functional diagram.

FIG. 8 illustrates a representative impulse radio receiver functional diagram.

DETAILED DESCRIPTION OF THE INVENTION

Figure 1B:
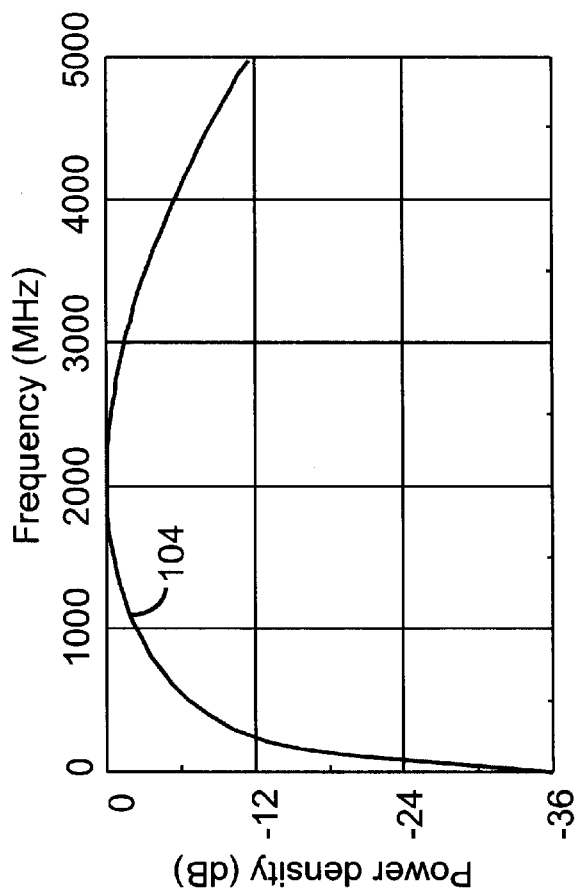
FIG. 1B illustrates the frequency domain amplitude of the Gaussian monocycle of FIG. 1A.

The description of the invention is segmented into sections according to the following table of contents.

TABLE OF CONTENTS

I. Impulse Radio Basics
  I.1. Waveforms
  I.2. Pulse Trains
  I.3. Coding for Energy Smoothing and Channelization
  I.4. Modulation
  I.5. Reception and Demodulation
  I.6. Interference Resistance
  I.7. Processing Gain
  I.8. Capacity
  I.9. Multipath and Propagation
  I.10. Distance Measurement
II. Exemplary Transceiver Implementation
  II.1. Transmitter
  II.2. Receiver
III. Fast Lock and Acquisition

I. Impulse Radio Basics

This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention and is not to be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position), and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wideband of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross-correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing, to eliminate direct current (DC) drift and errors from the detection process. This method is described in detail in U.S. Pat. No. 5,677,927, issued Oct. 14, 1997 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

I.1. Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out-of-band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna.

The basic equation normalized to a peak value of 1 is as follows:

$$f_{mono}(t) = \sqrt{e}\left(\frac{t}{\sigma}\right)e^{\frac{-t^2}{2\sigma^2}}$$

where $\sigma$ is a time scaling parameter, t is time, $f_{mono}(t)$ is the waveform voltage, and e is the natural logarithm base.

Figure 1A:
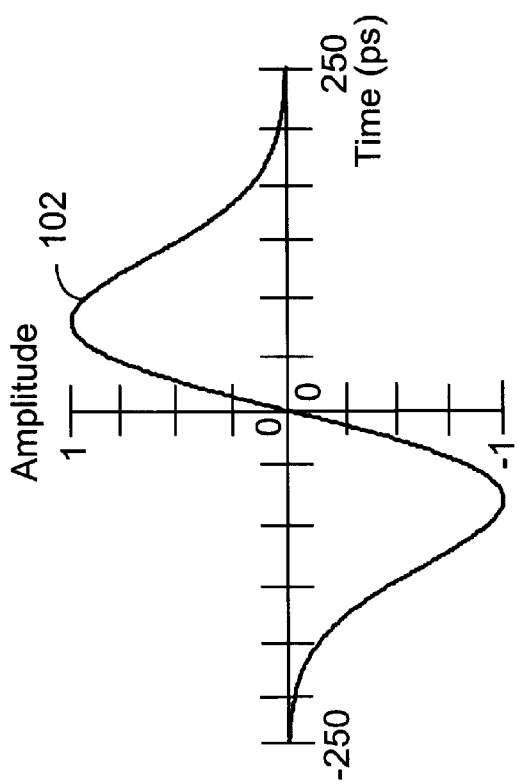
FIG. 1A illustrates a representative Gaussian monocycle waveform in the time domain.

The frequency domain spectrum $F_{mono}(f)$ of the above waveform is shown in FIG. 1B. The corresponding equation is:

$$F_{mono}(f) = (2\pi)^{\frac{3}{2}}\sigma f e^{-2(\pi\sigma f)^2}$$

where f is frequency. The center frequency ($f_c$), or frequency of peak spectral density, is:

$$fc = \frac{1}{2\pi\sigma}$$

Figures 2A, 2B:
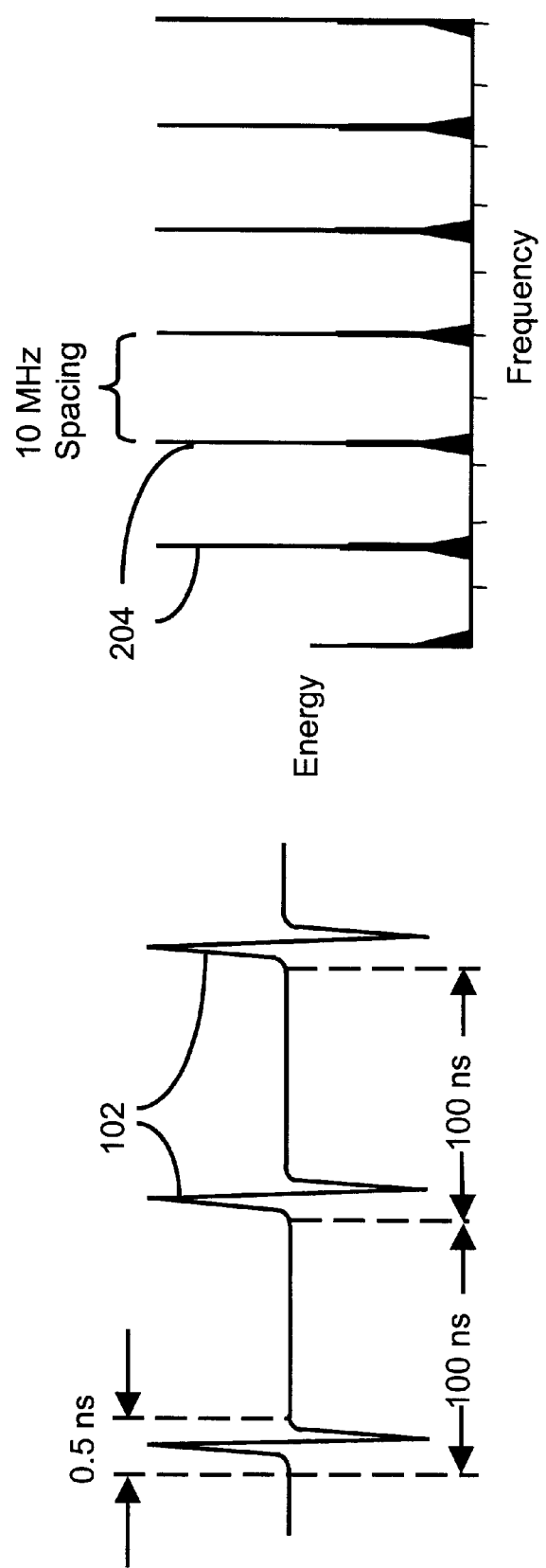
FIG. 2A illustrates a pulse train comprising pulses as in FIG. 1A.
FIG. 2B illustrates the frequency domain amplitude of the waveform of FIG. 2A.

In FIG. 2B, the center frequency is approximately 2 giga-Hertz (GHz).

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

I.2. A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Prototypes built by the assignee of the present invention have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102, which are spaced at 100 ns intervals. FIG. 2B, which shows 2 GHz at the center of the spectrum for the waveform of FIG. 2A, illustrates that the result of the pulse train in the frequency domain is to produce a spectrum comprising a set of lines 204 spaced at the frequency of the 10 Mpps pulse repetition rate, which is 10 MHz for this example. When the fall spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receivers sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

I.3. Coding for Energy Smoothing and Channelization

For high pulse rate systems, it may be necessary to more finely spread the spectrum than is achieved by producing comb lines. This may be done by pseudo-randomly positioning each pulse relative to its nominal position.

Figure 3:
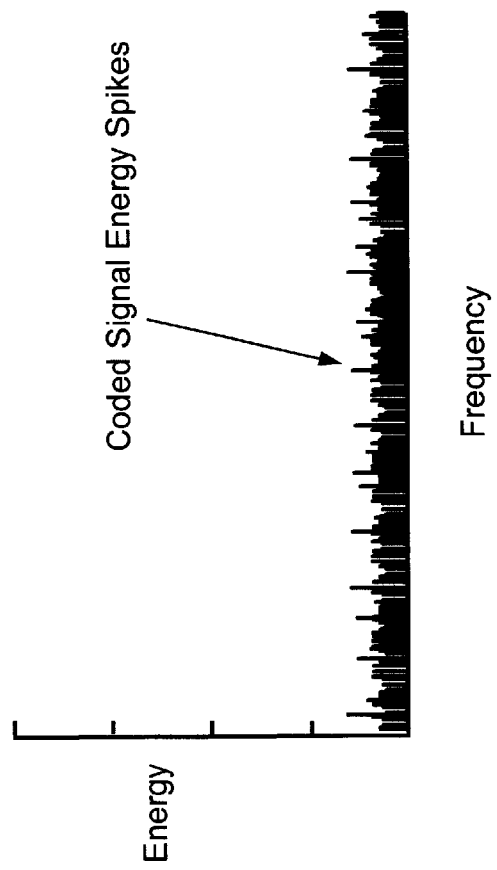
FIG. 3 illustrates the frequency domain amplitude of a sequence of time coded pulses.

FIG. 3 is a plot illustrating the impact of a pseudo-noise (PN) code dither on energy distribution in the frequency domain. A PN code is a set of time positions defining the pseudo-random positioning for each pulse in a sequence of pulses. FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross-correlation such that a pulse train using one code will seldom collide on more than one or two pulse positions with a pulse train using another code during any one data bit time. Since a data bit may comprise hundreds of pulses, this represents a substantial attenuation of the unwanted channel.

I.4. Modulation

Any aspect of the waveform can be modulated to convey information and, further, the modulation aids in smoothing the spectrum, minimizing structure in the resulting spectrum. Amplitude modulation, phase modulation, frequency modulation, time shift modulation, and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (i.e., in addition to PN code dither) in response to the information signal. This amount is typically very small relative to the PN code shift. In a 10 Mpps system with a center frequency of 2 giga-Hertz (GHz), for example, the PN code may command pulse position variations over a range of 100 ns; whereas, the information modulation may only deviate the pulse position by 150 picoseconds (ps).

Thus, in a pulse train of n pulses, each pulse is delayed a different amount from its respective time base clock position by an individual code delay amount plus a modulation amount, where n is the number of pulses associated with a given data symbol digital bit.

Figure 4:
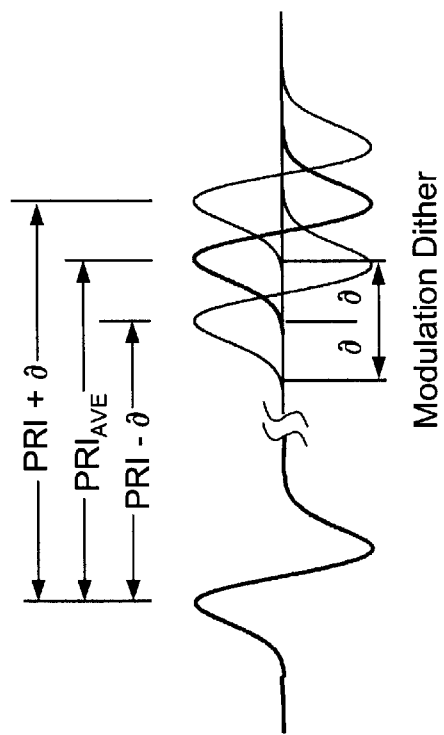
FIG. 4 illustrates modulating a signal.

With time shift modulation (also known as pulse position modulation), a matched filter (i.e., cross-correlator) is used in the receiver. As illustrated in FIG. 4, a modulating signal changes the pulse repetition interval (PRI) in proportion to the modulation. If the modulating signal has three levels, the first level, for example, shifts the generation of the pulse forward in time from the nominal PRI by $\partial$ ps; the second level does not shift the pulse position in time from the nominal PRI; and the third level shifts the pulse in time from the nominal PRI by $-\partial$ ps. This scheme is considered a digital time shift modulation scheme. Analog time shift modulation, on the other hand, allows continuous deviations between PRI$-\partial$ and PRI$+\partial$. In the impulse radio system, the maximum value of $\partial$ is approximately t/4, where t is the time duration of the pulse. The time measurement is assumed to be taken from the same part of the monocycle waveform on successive monocycles.

I.5. Reception and Demodulation

If there are a large number of impulse radio users within a confined area, mutual interference is likely to exist. While the PN coding minimizes this interference, the probability of an individual pulse from one user's sequence being received simultaneously with a pulse from another user's sequence increases as the number of users rises. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

I.6. Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 5:
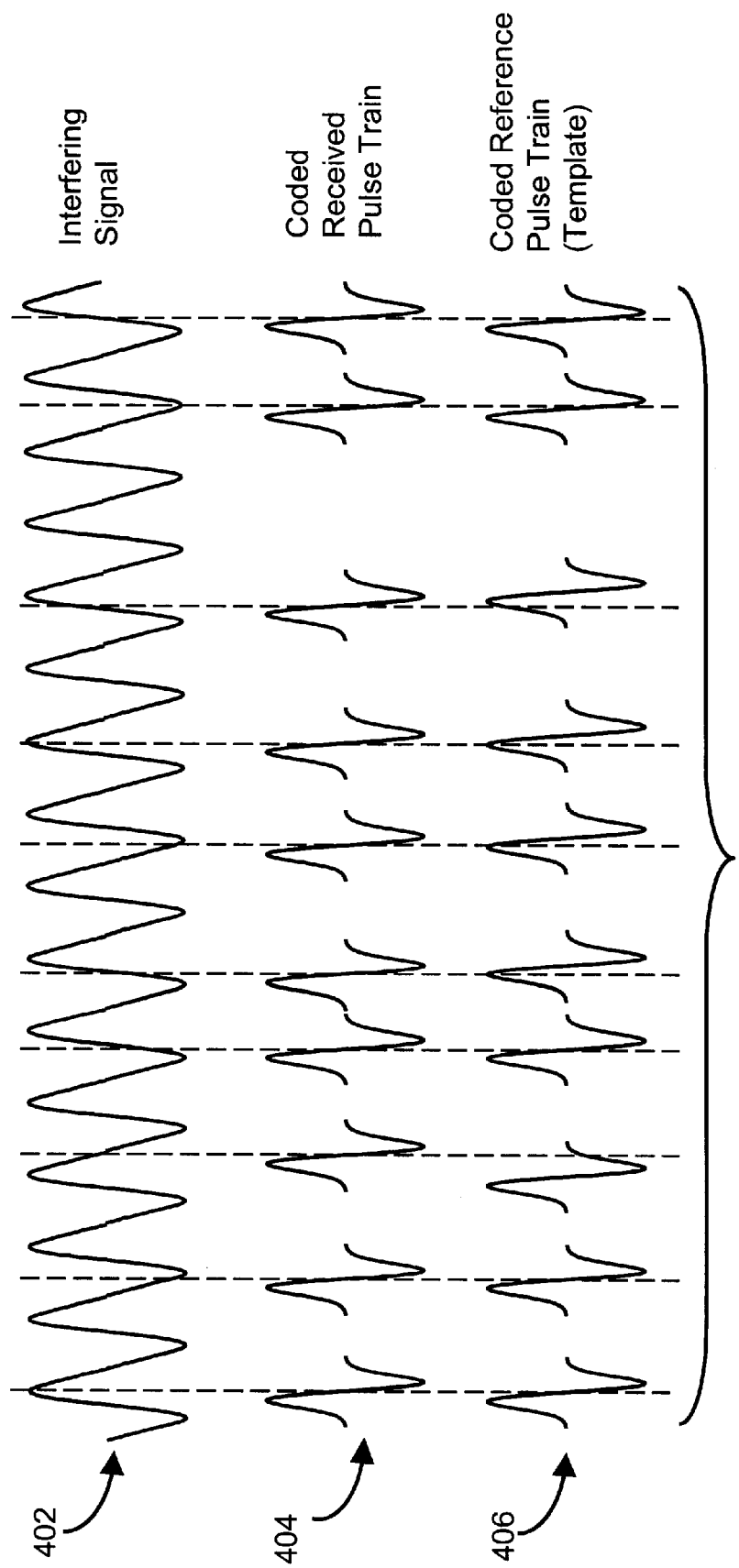
FIG. 5 illustrates a typical received signal and interference signal.

FIG. 5 illustrates the result of a narrow band sinusoidal interference signal 402 overlaying an UWB impulse radio signal 404. At the impulse radio receiver, the input to a cross-correlator includes the narrow band signal 402 and the received ultra-wideband impulse radio signal 404. The input is sampled by the cross-correlator with a PN dithered template signal 406. Without PN coding, the cross-correlator would sample the interfering signal 402 with such regularity that the interfering signals could cause significant interference to the impulse radio receiver. However, when the transmitted impulse signal is encoded with the PN code dither (and the impulse radio receiver template signal 406 is synchronized with that identical PN code dither) the cross-correlator samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating after the cross-correlator over many pulses overcomes the impact of interference.

I.7. Processing Gain

Am impulse radio system is generally resistant to interference because of its large processing gain. For typical spread spectrum systems, the definition of processing gain, which quantifies the decrease in channel interference when wideband communications are used, is the ratio of the bandwidth of the channel to the bit rate of the information signal. For example, a direct sequence spread spectrum system with a 10 kilo-Hertz (kHz) information bandwidth and a 10 MHz channel bandwidth yields a processing gain of 1000, or 30 decibels (dB). However, far greater processing gains are achieved with impulse radio systems. For example, for the same 10 kHz information, bandwidth is spread across a much greater 2 GHz channel bandwidth, and the theoretical processing gain is 200,000, or 53 dB.

I.8. Capacity

It has been shown theoretically, using signal-to-noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal-to-noise ratio as a result of these other users can be described by the following equation:

$$V_{tot}^2 = \frac{N\sigma^2}{\sqrt{Z}}$$

where $V^2_{tot}$ is the total interference signal-to-noise ratio variance at the receiver, N is the number of interfering users, $\sigma^2$ is the signal-to-noise ratio variance resulting from one of the interfering signals with a single pulse cross-correlation, and Z is the number of pulses over which the receiver integrates to recover the modulation.

This relationship suggests that link quality degrades gradually as the number of simultaneous users increases. It also shows the advantage of integration gain. The number of interfering users N that can be supported at the same interference level increases by the square root of the number of pulses Z integrated.

I.9. Multipath and Propagation

One of the striking advantages of impulse radio is its resistance to multipath fading effects. Conventional narrow band systems are subject to multipath fading through the Rayleigh fading process, where the signals from many delayed reflections combine at the receiver antenna according to their relative phase. This results in possible summation or possible cancellation, depending on the specific propagation to a given location. This also results in potentially wild signal strength fluctuations in mobile applications, where the mix of multipath signals changes for every few feet of travel.

Impulse radios, however, are substantially resistant to these effects. Impulses arriving from delayed multipath reflections typically arrive outside of the correlation time and thus are ignored. This process is described in detail with reference to FIGS. 6A and 6B. In FIG. 6A, three propagation paths are shown. The direct path is the shortest. It represents the straight line distance between the transmitter T and the receiver R. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

Figure 6B:
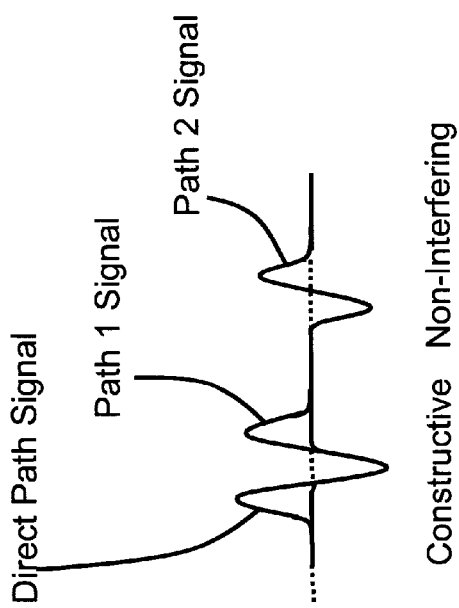
FIG. 6B illustrates exemplary multipath signals in the time domain.
Figure 6A:
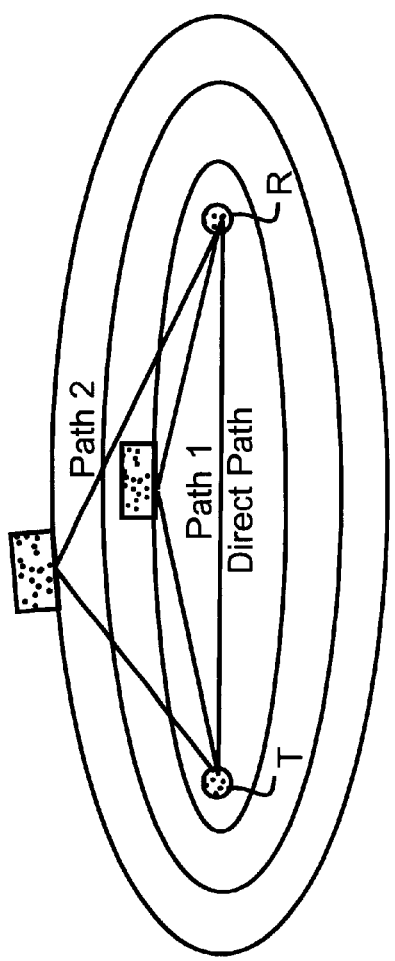
FIG. 6A illustrates a typical geometrical configuration giving rise to multipath received signals.

FIG. 6B represents a time domain plot of the received waveform from this multipath propagation configuration.

This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the cross-correlator template signal is positioned at the direct path signal, the path 2 signal produces no response. It can be seen that only the multipath signals resulting from very close reflectors have any effect. Hence, the bulk of the multipath signals, which are substantially delayed, are removed from the correlation process and are ignored.

The multipath signals delayed less than one quarter wavelength are the only signals that attenuate the direct path signal. As an example, one quarter wavelength is approximately 1.5 inches, or 3.5 cm at a 2 GHz center frequency. This multipath signal is the reflection from the first Fresnel zone, and this property is shared with narrow band signals; however, impulse radio is highly resistant to all other Fresnel zone reflections. The ability to avoid the highly variable attenuation from multipath gives impulse radio significant performance advantages.

I.10. Distance Measurement

Impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength and, potentially, down to the noise floor of the system. This time position measurement can be used to measure propagation delay to determine link distance, and once link distance is known, to transfer a time reference to an equivalently high degree of precision. The assignee of the present invention has built systems that have shown the potential for centimeter distance resolution, which is equivalent to about 30 ps of time transfer resolution. See, for example, commonly owned, co-pending U.S. patent application Ser. No. 09/045,929, filed Mar. 23, 1998, entitled "Ultrawide-Band Position Determination System and Method," and U.S. patent application Ser. No. 09/083,993, filed May 26, 1998, entitled "System and Method for Distance Measurement by Inphase and Quadrature Signals in a Radio System," both of which are incorporated herein by reference.

II. Exemplary Transceiver Implementation

II.1. Transmitter

FIG. 7 illustrates an exemplary embodiment of an impulse radio transmitter 602 of an impulse radio communication system having one subcarrier channel. The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618.

The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This filtering will usually cause each monocycle pulse to have more zero crossings (more cycles) in the time domain. In this case, the impulse radio receiver can use a similar waveform as the template signal in the cross correlator for efficient conversion.

II.2. Receiver

FIG. 8 illustrates an exemplary embodiment of an impulse radio receiver (hereinafter called the receiver) for the impulse radio communication system. More specifically, the system illustrated in FIG. 8 is for reception of digital data wherein one or more pulses are transmitted for each data bit.

The receiver 702 comprises a receive antenna 704 for receiving a propagated impulse radio signal 706. A received signal 708 from the receive antenna 704 is coupled to a cross-correlator or sampler 710 to produce a baseband output 712. The cross-correlator 710 includes multiply and integrate functions together with any necessary filters to optimize signal to noise ratio.

The receiver 702 also includes a precision timing generator 714, which receives a periodic timing signal 716 from a receiver time base 718. This time base 718 is adjustable and controllable in time, frequency, or phase, as required by a lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter 602 to generate the propagated signal 706. Thus, the timing of the template pulse train 730 matches the timing of the received signal pulse train 708, allowing the received signal 708 to be synchronously sampled in the cross-correlator 710. The cross-correlator 710 ideally comprises a multiplier followed by a short term integrator to sum the multiplier product over the pulse interval. Further examples and details of correlation and sampling processes can be found in commonly owned U.S. Pat. Nos. 4,641,317, 4,743,906, 4,813,057, and 4,979,186, which are incorporated herein by reference, and commonly owned and copending U.S. patent application Ser. No. 09/356,384, filed Jul. 16, 1999, titled: "Baseband Signal Converter Device for a Wideband Impulse Radio Receiver," which is incorporated herein by reference.

The output of the cross-correlator 710, also called a baseband signal 712, is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator 732 is then filtered or integrated in a pulse summation stage 734. The pulse summation stage produces an output representative of the sum of a number of pulse signals comprising a single data bit. The output of the pulse summation stage 734 is then compared with a nominal zero (or reference) signal output in a detector stage 738 to determine an output signal 739 representing an estimate of the original information signal 616.

The baseband signal 712 is also input to a lowpass filter 742 (also referred to as lock loop filter 742). A control loop comprising the lowpass filter 742, time base 718, precision timing generator 714, template generator 728, and cross-correlator 710 is used to generate a filtered error signal 744. The filtered error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 9A:
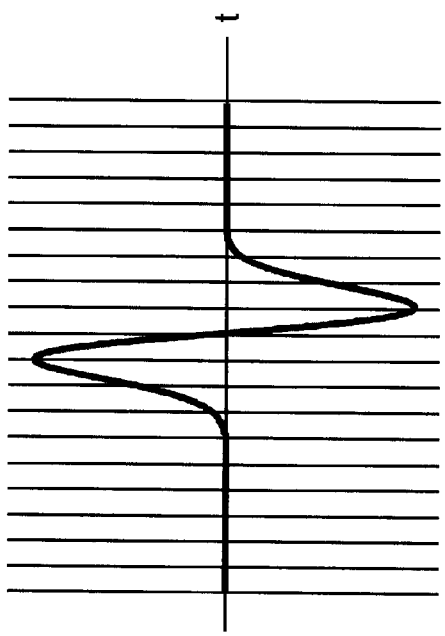
FIG. 9A illustrates a representative received pulse signal at the input to the cross-correlator.
Figure 9B:
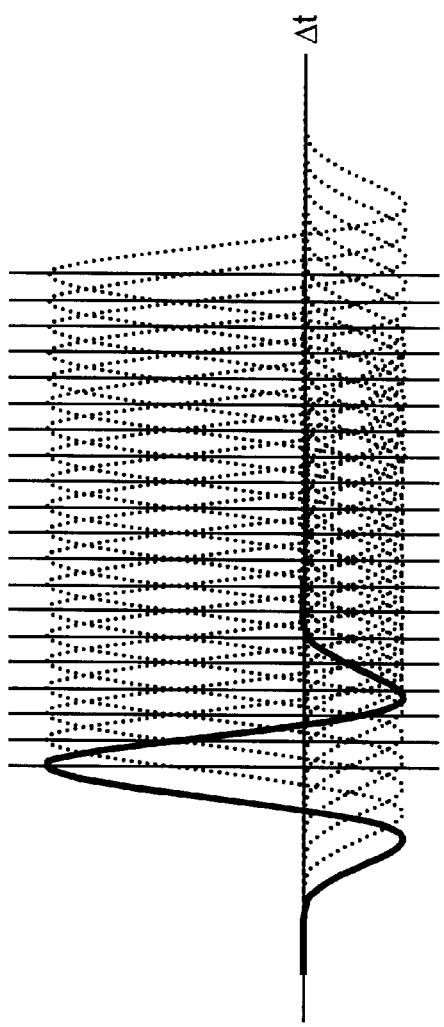
FIG. 9B illustrates a sequence of representative impulse signals in the correlation process.
Figure 9C:
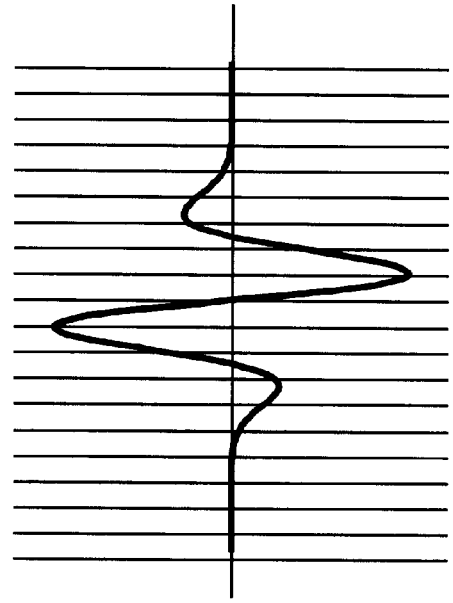
FIG. 9C illustrates the potential locus of results as a function of the various potential template time positions.

FIGS. 9A–9C illustrate the cross correlation process and the correlation function. FIG. 9A shows the waveform of a template signal 730. FIG. 9B shows the waveform of a received impulse radio signal 708 at a set of several possible time offsets Δt. FIG. 9C represents the output 712 of the cross-correlator (e.g., a multiplier and a short time integrator) for each of the time offsets Δt of FIG. 9B. Thus, this graph, FIG. 9C, does not show a waveform that is a function of time, but rather a function of time-offset, i.e., for any given pulse received, there is only one corresponding point which is applicable on this graph. This is the point corresponding to the time offset of the template signal used to receive that pulse.

Further examples and details of subcarrier processes and precision timing can be found described in U.S. Pat. No. 5,677,927, titled "An Ultrawide-Band Communications System and Method", and commonly owned co-pending application Ser. No. 09/146,524, filed Sep. 3, 1998, titled "Precision Timing Generator System and Method", both of which are incorporated herein by reference.

III. Fast Lock and Acquisition

The present invention is directed towards detecting an impulse radio signal, and more particularly, to fast lock and acquisition of an impulse radio signal.

An impulse radio signal is assumed to be sent by a transmitter to a receiver, which may be part of a one-way or two-way communication system. Initially, the transmitter sends an acquisition data signal to the receiver to assist the receiver in acquiring and locking on the signal to be sent by the transmitter. The acquisition data signal is comprised of 1 or more bits and is further discussed below with respect to FIG. 16. Each bit of the acquisition data sent by the transmitter is comprised of 1 or more pulses. The number of bits and the number of pulses per bit is determined by a number of variables, including pulse rate, bit rate, interference levels, range, and noise. The possible locations in time of the pulses that comprise a bit of the acquisition data sent by the transmitter are predetermined and are stored in the receiver. In addition, the receiver stores data for verifying the acquisition data. Hence, the receiver knows the time locations of the pulses for a bit of data relative to the other pulses in the bit, but the receiver does not know when in time the bit begins or when in time the acquisition data begins. For example, the receiver knows the pseudorandom sequence being used by the transmitter but does not know the location in time of the pseudorandom sequence. The present invention solves this problem by detecting the beginning of a bit, detecting the beginning of an acquisition data containing the bit, and verifying the contents of the acquisition data.

Figure 10:
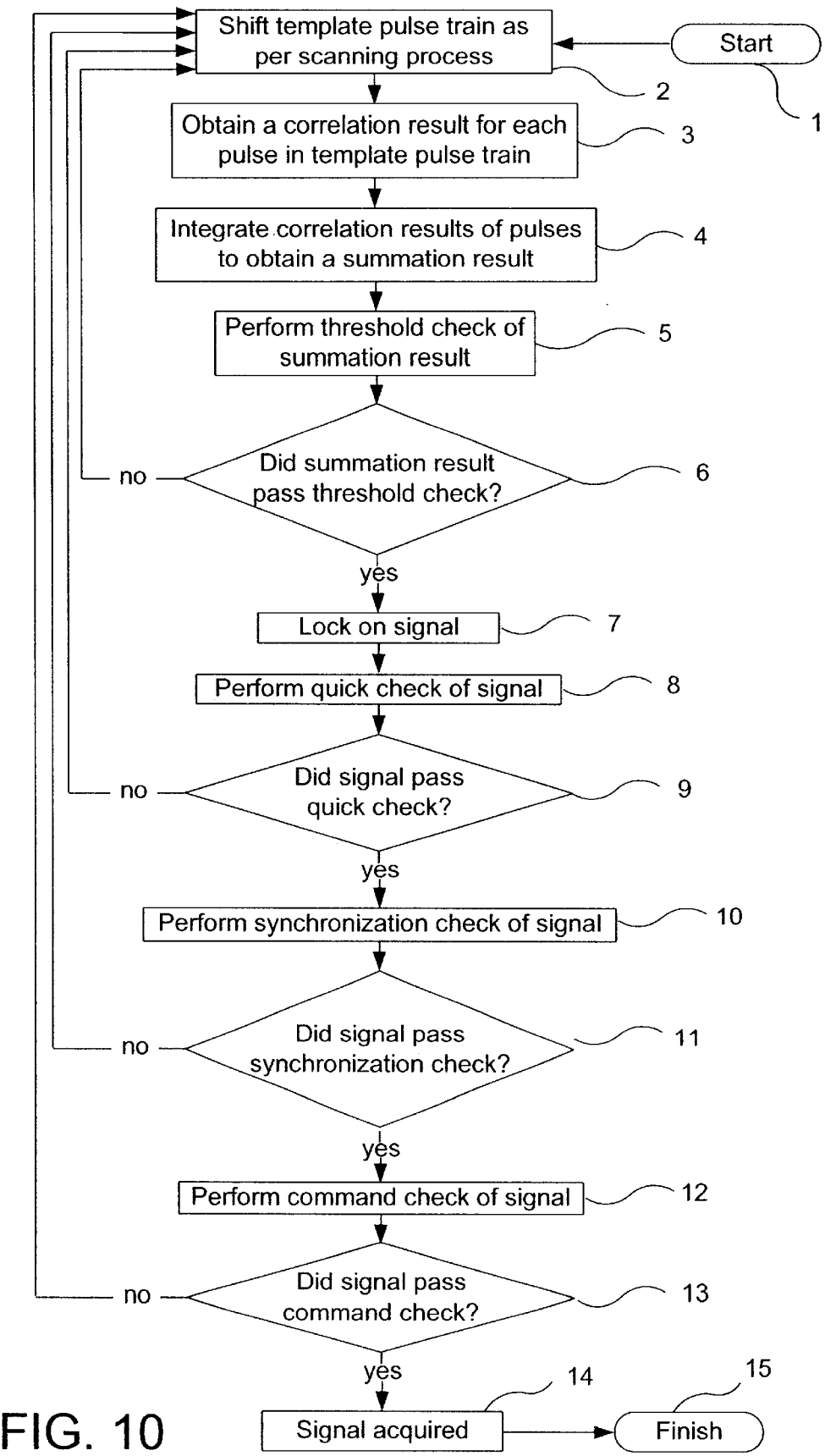
FIG. 10 illustrates a flow diagram for fast lock and acquisition of an impulse radio signal using the invention.

FIG. 10 illustrates a flow diagram for fast lock and acquisition of an impulse radio signal using the invention. In block 1, the fast lock and acquisition of the impulse radio signal starts. In block 2, a template pulse train is obtained and shifted as per a scanning process. The template pulse train includes a series of pulses and is compared in block 3 by a cross-correlator to a received impulse radio signal, which may or may not have the identical pattern of pulses as the template pulse train. Through shifting the template pulse train, the template pulse train is placed at various locations in time as compared to the received impulse radio signal until a match is obtained between the template pulse train and the received impulse radio signal. The template pulse trains available in the receiver can have the same or different lengths. The operation of block 2 is explained with reference to FIGS. 11 and 12.

Figure 11:
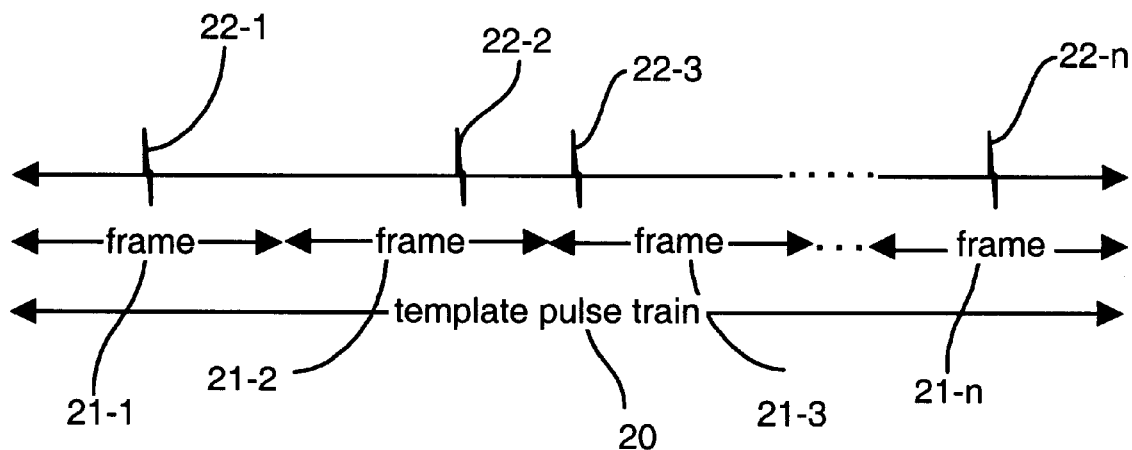
FIG. 11 illustrates a template pulse train.

FIG. 11 illustrates a template pulse train 20. The template pulse train has a length of approximately one bit of an impulse radio signal. Alternatively, the template pulse train can have a length of greater than or less than approximately one bit of an impulse radio signal. The length of a bit for an acquisition and lock period can be the same or different than a length of a bit for a communication period after the acquisition and lock period. The template pulse train 20 is divided into n frames 21-1, 21-2, 21-3, . . . , 21-n. Each frame 21-1, 21-2, 21-3, . . . , 21-n includes a single pulse 22-1, 22-2, 22-3, . . . , 22-n, respectively.

As an example, if each pulse 22-1, 22-2, 22-3, . . . , 22-n has a width of approximately 0.5 ns, the template pulse train has 100 frames, and each frame has a length of approximately 10 μs, the template pulse train has a total length of approximately 1 ms.

Figure 12:
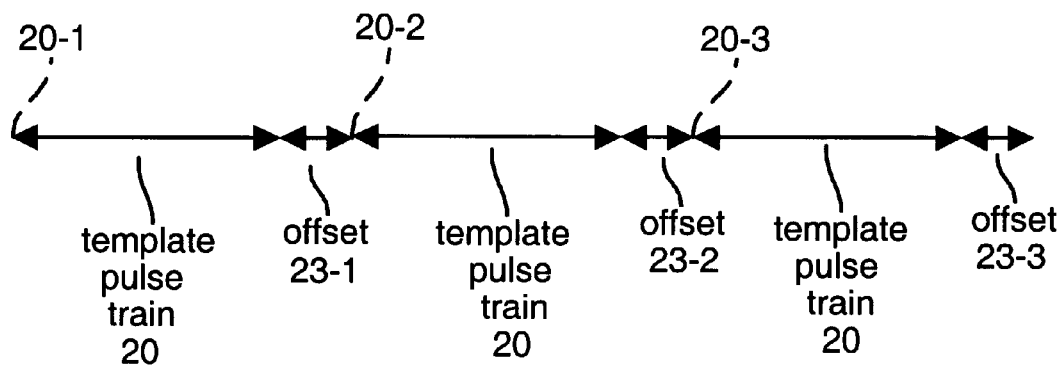
FIG. 12 illustrates shifting a template pulse train by an offset.

FIG. 12 illustrates shifting the template pulse train by an offset. After being located at a first position 20-1, the flow of FIG. 10 proceeds from block 2 to block 3. After the flow of FIG. 10 returns to block 2 from block 6, 9, 11, or 13, the template pulse train 20 is offset in time by a first offset 23-1 to a second position 20-2. After the flow of FIG. 10 again returns to block 2 from block 6, 9, 11, or 13, the template pulse train 20 is offset in time by a second offset 23-2 to a third position 20-3. After the flow of FIG. 10 once again returns to block 2 from block 6, 9, 11, or 13, the template pulse train 20 is offset in time by a third offset 23-3, and so on. In general, the beginning of the template pulse train 20 is shifted in time by an offset plus n lengths of the template pulse train, where n is a natural number and n≧1.

To cover each possible combination of the template pulse train and the received impulse signal, the template pulse train needs to be shifted by approximately ¼ wavelength of a pulse throughout the entire length of the template pulse train. The strategy for shifting the template pulse train through all possible variations determines the offset to be used for shifting the template pulse train, and numerous strategies exist for selecting the offset and shifting the template pulse train.

For example, the offset can be approximately ¼ wavelength of a pulse in the template pulse train, or a pulse in the impulse radio signal. If the length of a pulse is approximately 0.5 ns, a ¼ wavelength is approximately 0.125 ns, or ⅛ ns. If a template pulse train has 100 frames, and if each frame has a length of 10 μs, a complete scan of the received impulse radio signal at a ¼ wavelength offset would require 80,000 steps, and require approximately 0.8 seconds. This approach is viewed as a fine step scanning process.

Instead of a fine step scanning process, a coarse step scanning process can be used, where the offset is greater than approximately ¼ wavelength of a pulse in the impulse radio signal. As an example, the offset can be greater than approximately the time between two pulses in the impulse radio signal, which averages to be approximately the length of a frame in the template pulse train. For instance, if each pulse is approximately one frame apart, and if each frame has a length of approximately 10 μs, the time between two pulses is approximately 10 μs. Once the template pulse train has been shifted by the number of frames in the template pulse train, the template pulse train is shifted by one frame plus ¼ of a wavelength of a pulse. The shifting repeats until all possible offsets are checked, and then the scanning begins anew.

As an option, other offsets can be used for course step scanning. For example, the offset can be greater than a wavelength of a pulse in an impulse radio signal. For instance, the offset can be greater than approximately 0.5 ns.

As another example, the offset can be greater than approximately the correlation time of a pulse in an impulse radio signal. For instance, the offset can be greater than approximately the time to receive approximately most, approximately all, or all of the multipath impulse radio signals for one pulse of the impulse radio signal. For instance, the offset can be a time greater than the approximate time of multipath reflections.

By using coarse step scanning instead of fine step scanning, advantages of the impulse radio system arising from multipath characteristics can be used. The receiver need not lock exactly on the transmitted impulse radio signal and can lock on a multipath impulse radio signal of the transmitted radio signal. If the receiver loses lock because of changed multipath characteristics, the receiver can likely re-lock in a short amount of time.

As an additional example of a shifting strategy, the offset can be determined through a random offset generating process. For example, a random number generator can be used to select an offset to shift the template pulse train, where the selected offset is not an offset previously selected by the random number generator. As an option, a random offset can be generated using oscillator drift. With this option, the inherent drift of the oscillator can be used to adjust the offset for shifting the template pulse train.

As an additional example of a shifting strategy, the offset can be determined via reverse binary scanning, which can be considered a type of coarse step scanning. With reverse binary scanning, an initial offset (IO) is set to be greater than ¼ wavelength of a pulse and preferably greater than the approximate time of multipath reflections. Once the initial scan is completed, the template pulse train is shifted with an offset determined by:

offset=*IO*M* where M is a multiplier multiplying the initial offset IO. The multiplier M is given by the following sequence: 0, ½, ¼, ¾, ⅛, ⅝, ⅜, ⅞, 1/16, 9/16, 5/16, 13/16, 3/16, 11/16, 7/16, 15/16, 1/32, 17/32, 9/32, 25/32, 5/32, 21/32, 13/32, 29/32, 3/32, 19/32, 11/32, 27/32, 7/32, 23/32, 15/32, 31/32, 1/64, etc., where M=0 is the initial case. The scanning continues until IO*M is less than ¼ wavelength of a pulse after the initial case. As an option, the initial case can be M=1.

This type of scanning is known as reverse binary scanning because a binary sequence of numbers is reversed from least significant bit to most significant bit to provide the fraction of the multiplier M. For example, for a denominator of 8 for M, three bits are needed, and the multiplier M is determined as follows:

| 000 |  | 000 |  | 0/8 = 0 |
|---|---|---|---|---|
| 001 |  | 100 |  | 4/8 = 1/2 |
| 010 |  | 010 | Obtain | 2/8 = 1/4 |
| 011 | → Reverse → | 110 | → numerator→ | 6/8 = 3/4 |
| 100 | bits | 001 | for *M* from | 1/8 |
| 101 |  | 101 | binary number | 5/8 |
| 110 |  | 011 |  | 3/8 |
| 111 |  | 111 |  | 7/8 |

The same procedure continues by adding more bits to obtain more fractions (i.e., multipliers M) for the offset. Moreover, in general, the reverse binary scanning can be extended to reverse n-ary scanning, where n is any desired base.

Referring back to FIG. 10, in block 3, a correlation result is obtained for each pulse in the template pulse train. The received impulse radio signal and the template pulse train are compared via a cross-correlator (e.g., an integration, or a multiplication and summation) as illustrated with FIGS. 9A–9C.

In block 4, the correlation results for each impulse in the template pulse train are compared to obtain a comparison result. Preferably, the correlation results for each impulse in the template pulse train are integrated, or summed, to obtain a summation result. If the location of the template pulse train matches the transmitted impulse radio signal, the summation result appears as an approximate ramp function over time if 2 or more pulses are included in the template pulse train. An increasing ramp function indicates a first bit value, and a decreasing ramp function indicates a second bit value.

Figure 13:
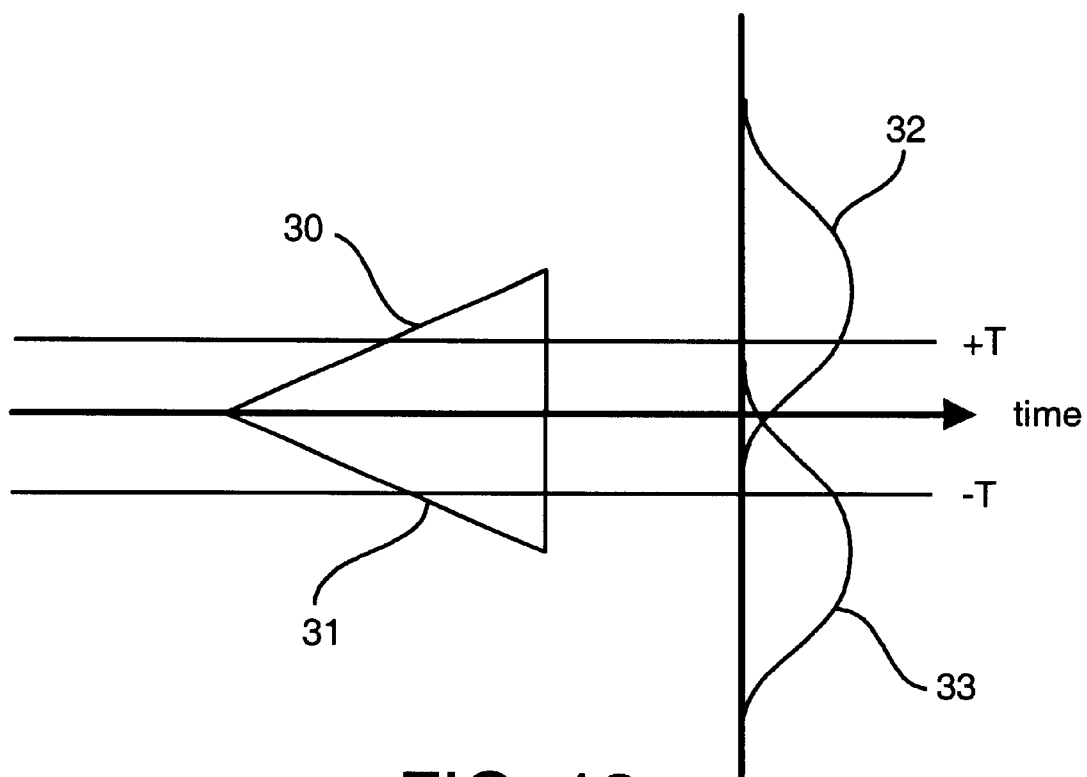
FIG. 13 illustrates a summation result.

FIG. 13 illustrates the two possible summation results. The summation result 30 exhibits an integration of the correlation results which ideally forms an increasing ramp, and the summation result 31 exhibits an integration of the correlation results which ideally forms a decreasing ramp. In practice, the resulting ramp function is not linear but is approximately linear due to noise. If the template pulse train is not aligned with the impulse radio signal, no ramp function is ideally obtained, and the summation result is approximately equal to the summation of positive and negative random numbers.

In block 5, a threshold check of the comparison result, or the summation result, from block 4 is performed. Preferably, the summation result from block 4 is compared to a threshold T. If the magnitude of the summation result is greater than or equal to the threshold T, it is assumed the template pulse train has matched the impulse radio signal. If the magnitude of the summation result is less than the threshold T, it is assumed that the template pulse train does not match the impulse radio signal.

The threshold T is selected above the noise level to deter signaling too many false alarms. Preferably, the threshold T is selected to maintain a constant false alarm rate, and various values can be selected for the threshold T. For example, referring to FIG. 13, if it is assumed that the summation results have a Gaussian distribution 32 for summation results 30 with an increasing ramp and a Gaussian distribution 33 for summation results 31 having a decreasing ramp, the threshold selected is preferably $1.5\sigma$, where $\sigma$ is the standard deviation of the Gaussian function. The selection of $T=1.5\sigma$ results in $\frac{1}{16}$ false alarms and $\frac{1}{16}$ missed signals. Other values for the threshold T can be selected to obtain other false alarm rates.

In block 6, if the comparison result passed the threshold check, flow proceeds to block 7. If the comparison result failed the threshold check, flow proceeds back to block 2.

In block 7, after the comparison result passes the threshold check, the received impulse radio signal is locked on. Preferably, the impulse radio signal is locked on at this point in the flow, which is prior to the remaining checks to be performed. If the impulse radio signal is not locked on at this point in the flow, the oscillator of the receiver may drift, which can cause the impulse radio signal to be lost, and the process to be restarted. The locking on of the impulse radio signal at this point in the process is known as a fast lock.

Figure 14:
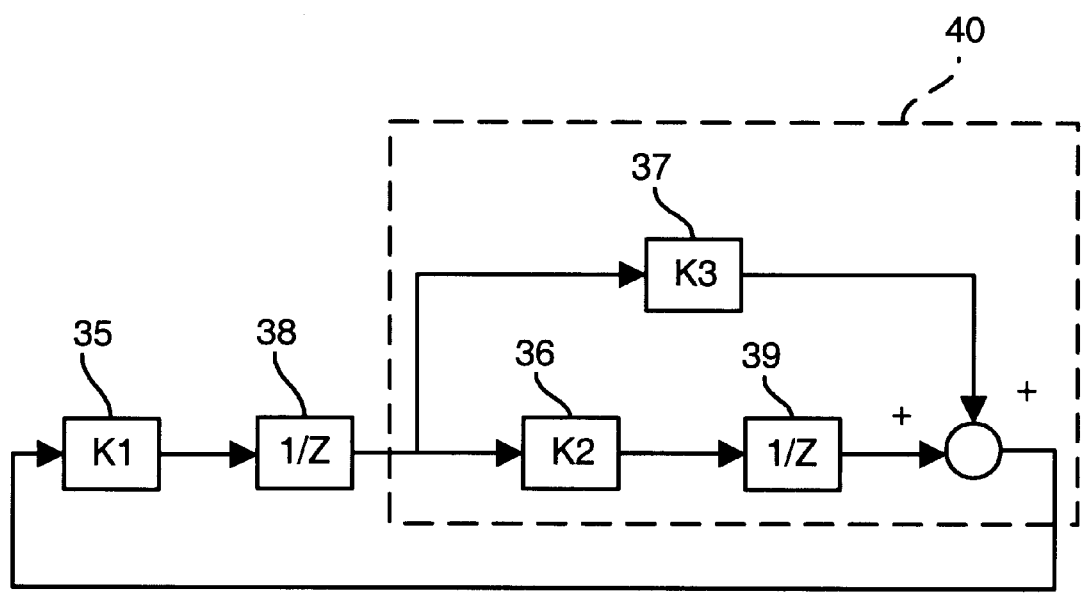
FIG. 14 illustrates a system for use in locking on the impulse radio signal.

FIG. 14 illustrates a system for use in locking on the received impulse radio signal. The system in FIG. 14 employs three gains 35, 36, and 37 and two delays 38 and 39. The closed-loop system employs a proportional-integral controller 40, which includes gain 36, gain 37, and delay 39. The values for the gains 35, 36, and 37 can be determined and fixed to obtain desired control loop properties.

As an option, the values for gains 35 and 36 can be time-varying. For example, the gains 35 and 36 can be, respectively, $K_1=1/T$ and $K_2=1/\sqrt{T}$, where T is the time counted from when the loop is closed.

Besides the system illustrated in FIG. 14 for use in locking on the received impulse radio signal, other systems can be used. As examples, the following can be used for locking on the received impulse radio signal: a low pass filter; an integrating filter; a gated integrator; an input limiter; a gain scheduler employing $1/(a+t)$; an optimal filter; an automatic gain control; a fast capture; and a slow hold.

In block 8, after the received impulse radio signal is locked on, a quick check of the received impulse radio signal is performed. A quick check is used to quickly verify that the impulse radio signal has actually been locked on. The quick check tests a number of subsequent portions of the impulse radio signal to verify the acquisition of the received impulse radio signal. The quick check preferably removes any false alarms signaled in block 6. The quick check determines that at least X of the next Y tested portions of the impulse radio signal match the template pulse train. For example, X=2, and Y=3.

Figure 15:
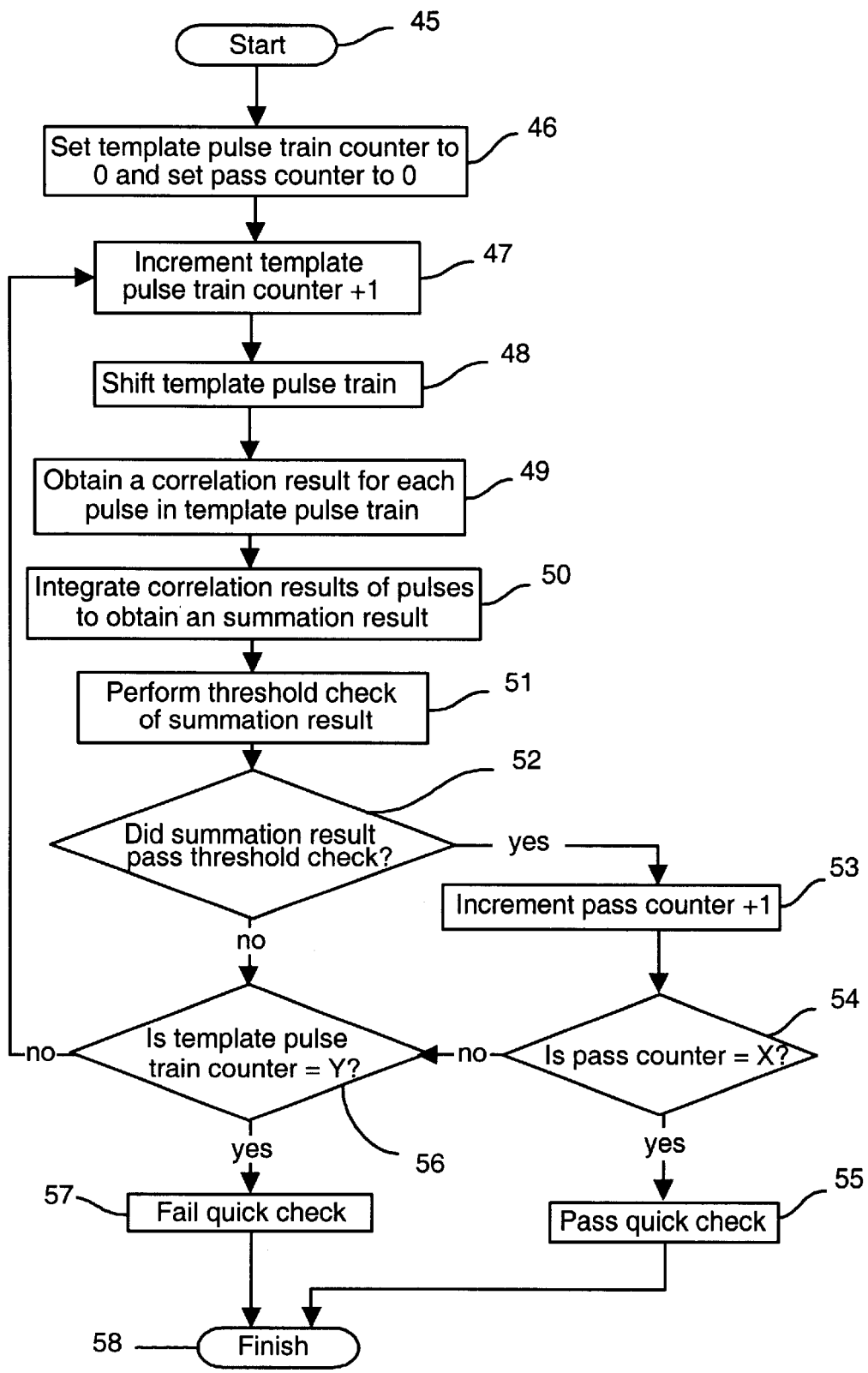
FIG. 15 illustrates a flow diagram for the quick check.

FIG. 15 illustrates a flow diagram for the quick check of block 8. The quick check incorporates several of the blocks from FIG. 10 and determines whether the template pulse train is aligned with the received impulse radio signal via a repetition of blocks 2–6 in FIG. 10. In block 45, the quick check starts. In block 46, a template pulse train counter is set to 0, and a pass counter is set to 0. In block 47, the template pulse train counter is incremented by 1. Blocks 49–52 are the same as blocks 3–6 in FIG. 10, and the discussion of these blocks is omitted.

In block 53, the pass counter is incremented by 1. In block 54, the value for the pass counter is compared to X, where $1 \leq X$. If the pass counter is equal to X, flow proceeds to block 55. If the pass counter is not equal to X, flow proceeds to block 56. In block 55, the received impulse radio signal passed the quick check.

In block 56, the template pulse train counter is compared to Y, where $1 \leq X \leq Y$. If the template pulse train counter is equal to Y, flow proceeds to block 57. If the template pulse train counter is not equal to Y, flow proceeds to block 47. In block 57, the received impulse radio signal failed the quick check. In block 58, the quick check is finished.

Referring to FIG. 10, after the quick check is performed, flow proceeds to block 9. In block 9, it is determined if the received impulse radio signal passed the quick check. If the received impulse radio signal passed the quick check, flow proceeds to block 10. If the received impulse radio signal failed the quick check, flow proceeds to block 2.

In block 10, a synchronization check of the received impulse radio signal is performed. Once the quick check has been passed, it is assumed that the locations of the pulses in the received impulse radio signal have been determined. With the synchronization check, the location of the beginning of the acquisition data is determined.

Figure 16:
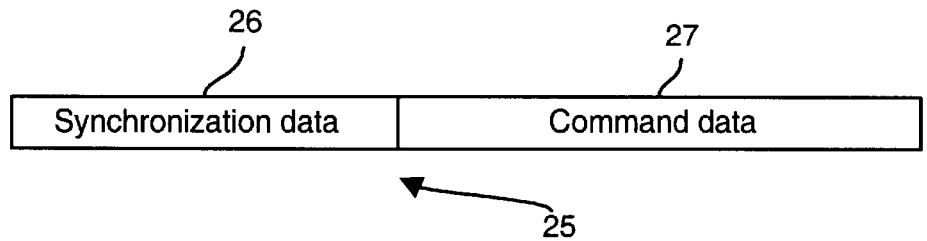
FIG. 16 illustrates acquisition data.

FIG. 16 illustrates acquisition data 25. The acquisition data 25 is transmitted by the transmitter and includes synchronization data 26 and command data 27. Preferably, the synchronization data 26 is determined by an error tolerant code, such as one of the Stiffler codes. Stiffler codes are described in the following, which is incorporated herein by reference: J. J. Stiffler, "Synchronization Techniques," in *Digital Communications with Space Applications*, edited by S. W. Golomb, 1964, pp. 135–160. For example, if four bits are used for the synchronization data, one of 16 code words, as determined by the Stiffler code, can be used for the synchronization data 26. Advantageously, by using Stiffler codes, one code word is not mistaken for another code word. Preferably, the synchronization data 26 has approximately 32 data bits, and the command data 27 has a length of approximately 32 data bits. The command data 27 is discussed further with respect to FIG. 18. In addition, with the invention, Stiffler codes are used for encoding an impulse radio signal to lock and acquire the impulse radio signal.

Figure 17:
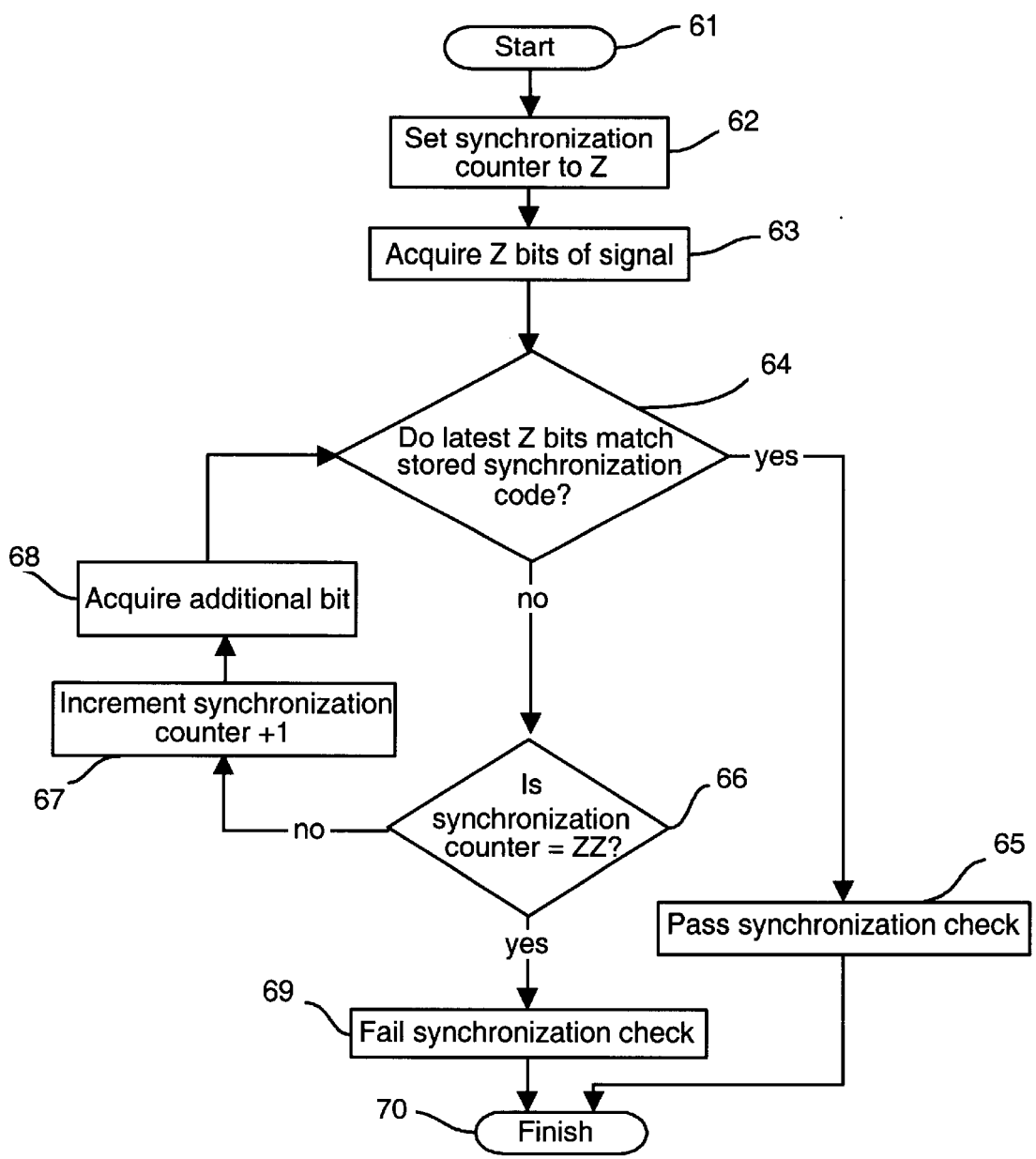
FIG. 17 illustrates a flow diagram for the synchronization check.

FIG. 17 illustrates a flow diagram for the synchronization check of block 10. In block 61, the synchronization check starts. In block 62, a synchronization counter is set to Z, where Z is a natural number and $1 \leq Z$. In block 63, Z bits of the received impulse radio signal are acquired. In block 64, it is determined whether the Z bits match a stored synchronization code. If the bits match, flow proceeds to block 65. If the bits do not match, flow proceeds to block 66. In block 65, the signal passed the synchronization check.

In block 66, it is determined whether the synchronization counter is equal to V, where V is a natural number and $1 \leq Z \leq V$. If the synchronization counter is equal to V, flow proceeds to block 69. If the synchronization counter is not equal to V, flow proceeds to block 67. In block 67, the synchronization counter is incremented by 1. In block 68, an additional bit is acquired, and flow proceeds to block 64. In block 69, the signal failed the synchronization check. In block 70, the synchronization check is finished.

If the received impulse radio signal passed the synchronization check, the beginning of the acquisition data has been located, and if the signal failed the synchronization check, the beginning of the acquisition data has not been located. By selecting V for block 66, the number of bits checked prior to failure is determined.

Referring to FIG. 10, the flow proceeds from block 10 to block 11. In block 11, it is determined whether the received impulse radio signal passed the synchronization check. If the received impulse radio signal passed, flow proceeds to block 12, and if the received impulse radio signal failed, flow proceeds to block 2.

In block 12, a command check of the received impulse radio signal is performed. In the command check, it is assumed that the beginning of the acquisition data 25 transmitted by the transmitter has been determined via the synchronization check. In block 12, it is determined whether the correct acquisition data has been received by the receiver and whether the receiver has acquired the correct impulse radio signal.

Referring to FIG. 16, the contents of the command data 27 of the acquisition data 25 determines the outcome of the command check. For instance, the command data 27 of the acquisition data 25 can include a transmitter identification and/or a receiver identification. The receiver may store a transmitter identification corresponding to the transmitter from which information is being received, and may store a receiver identification identifying itself. If the transmitter identification of the command data 27 does not match the stored transmitter identification, the received impulse radio signal failed the command check, and otherwise, the received impulse radio signal passed the command check. Further, if the receiver identification of the command data 27 does not match the stored receiver identification, the received impulse radio signal failed the command check, and otherwise, the received impulse radio signal passed the command check. The command data 27 may include the following, which may also be stored in the receiver: transmitter identification; receiver identification; date identification; time identification; communication protocol; network protocol; power control information; and any combination thereof.

Figure 18:
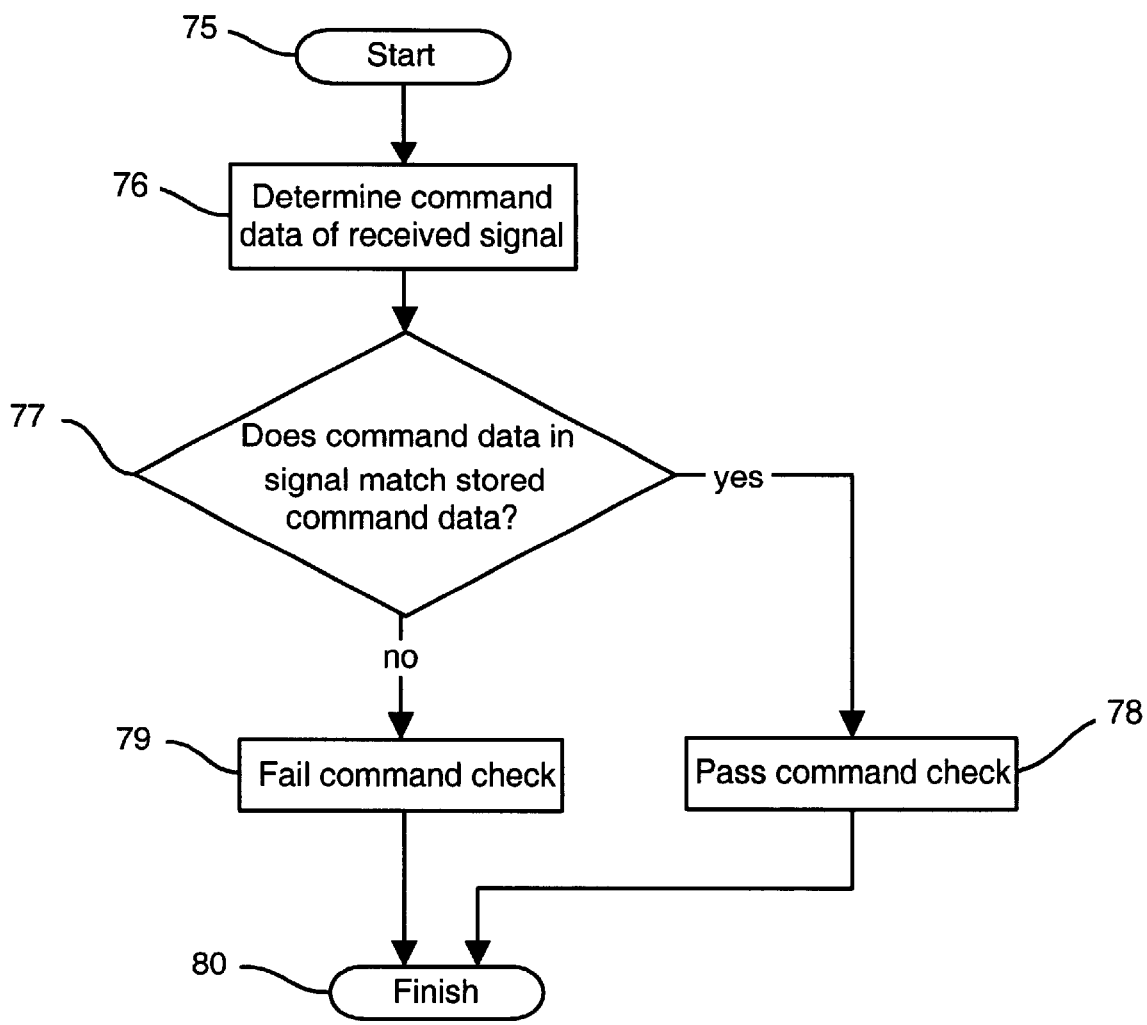
FIG. 18 illustrates a flow diagram for the command check.

FIG. 18 illustrates a flow diagram for the command check of block 12. In block 75, the command check starts. In block 76, the command data of the received impulse radio signal is determined. In block 77, the command data from the received impulse radio signal is compared to stored command data. If the received command data matches the stored command data, flow proceeds to block 78. If the received command data does not match the stored command data, flow proceeds to block 79. In block 78, the signal passed the command check. In block 79, the signal failed the command check. In block 80, the command check finishes.

Referring to FIG. 10, flow proceeds from block 12 to block 13. In block 13, it is determined whether the received impulse radio signal passed the command check. If the received impulse radio signal passed, flow proceeds to block 14, and if the received impulse radio signal failed, flow proceeds to block 2. In block 14, the received impulse radio signal has been acquired and locked on. In block 15, the fast lock and acquisition of the impulse radio signal is finished.

With the invention, the impulse radio signal transmitted by the transmitter during a locking and acquisition period (e.g., the time to execute the process illustrated in FIG. 10) has both a locking purpose and a non-locking purpose. As to the locking purpose, the goal is to have the receiver lock on and acquire the transmitted impulse radio signal. As to the non-locking purpose, the goal is to transmit information to the receiver via the command data 27 of the acquisition data 25.

Once the impulse radio signal is locked on and acquired, the locking and acquisition period ends and a communication period begins. If the impulse radio signal is lost during the communication period, a re-lock and re-acquisition period begins, and the process in FIG. 10 is performed again, although with a modification to block 2.

In block 2 of re-lock and re-acquisition, the scanning process does not need to start "cold," and the parameters used to lock the signal previously are used to re-start the scanning process. Preferably, the previous initial location of the beginning of the template pulse train is used as the initial position in the scanning process and can be determined from a previously correctly obtained template pulse train. As an option, a projected next template pulse train can be used to determine the initial position of the scanning process.

To determine the offset in the scanning process, the timing locations around the initial position are searched using an initial position plus an offset, where the offset is determined with the following sequence: +¼ wavelength of a pulse, −¼ wavelength of a pulse, +½ wavelength of a pulse, −½ wavelength of a pulse, +¾ wavelength of a pulse, and so on. The search strategy uses an incremented offset of an alternating additional +¼ and −¼ wavelength of a pulse. As an option, offsets having a magnitude greater than ¼ wavelength of a pulse can be used. For example, an offset having a magnitude of ½, ¾, 1, and so on wavelength of a pulse can be used. Because the process for selecting the offsets can be viewed as generating a cone around the initial offset, the process is referred to as a conical scanning process.

To assist the receiver in maintaining lock and to reduce the necessity of a re-lock and re-acquisition period after the impulse radio signal is lost by the receiver, locking and acquisition data can be interspersed among the information data sent by the transmitter. For example, additional acquisition data 25 can be interspersed by the transmitter among the information data. Depending on the type of locking and acquisition data interspersed, same or all of the aspects of the process illustrated in FIG. 10 are performed when the locking and acquisition data is transmitted by the transmitter.

Figure 19:
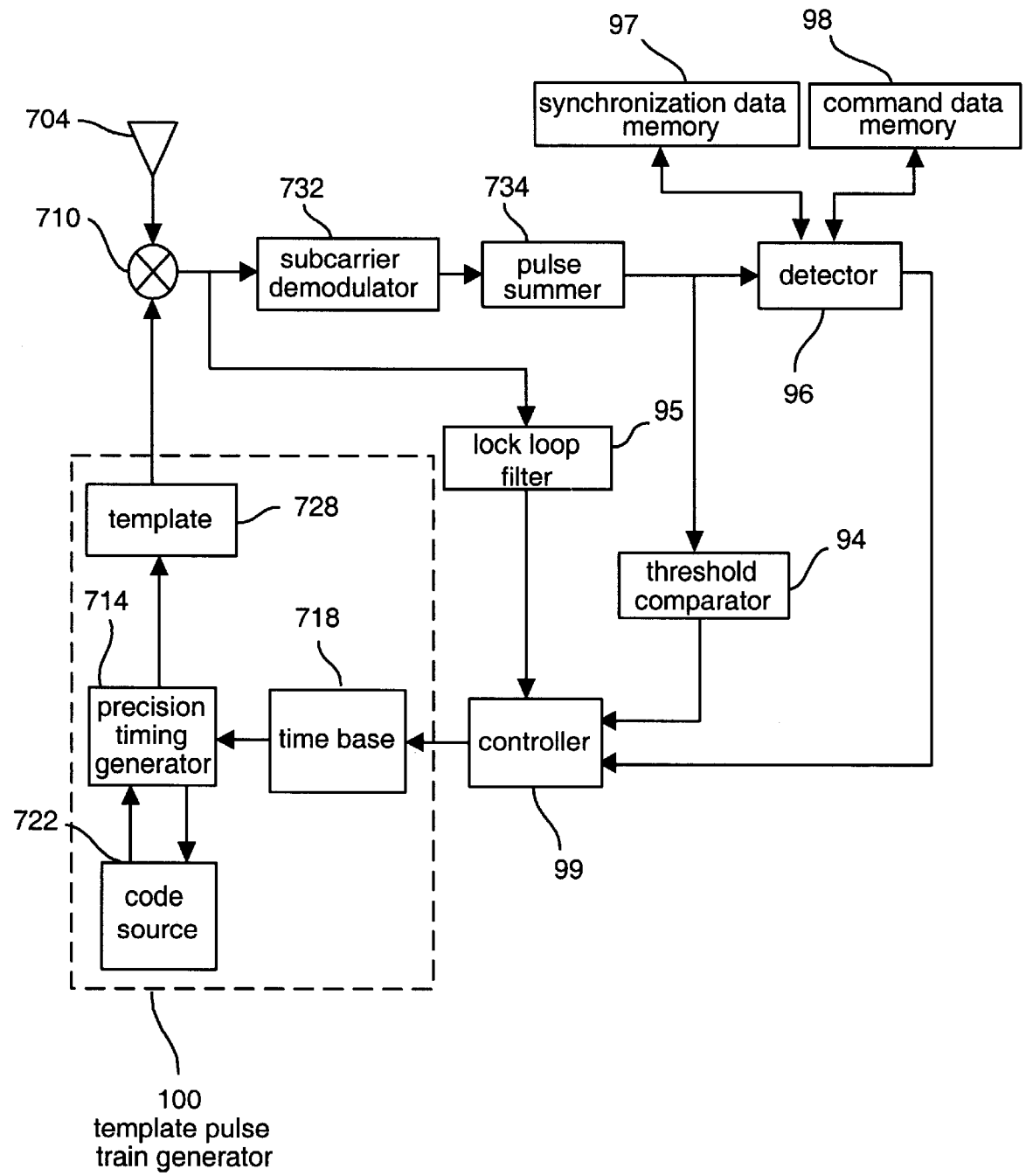
FIG. 19 illustrates a block diagram for a system for implementing the invention.

FIG. 19 illustrates a block diagram for a system for implementing the invention. The system of FIG. 19 can be implemented in a receiver for a one-way or two-way communication system. The system of FIG. 19 is similar to the system of FIG. 8, except for the additional blocks used to implement fast lock and acquisition of the impulse radio signal. A discussion of the components of FIG. 19 that are identical to those of FIG. 8 is omitted.

The template generator 728, the precision timing generator 714, the code source 722, and the adjustable time base 718 implement a template pulse train generator 100. Other techniques for implementing the template pulse train generator 100 can be used within the scope of the invention.

The cross-correlator 710 performs the function in block 3 of FIG. 10. The cross-correlator 710 combines a received impulse radio signal from the antenna 704 and a template pulse train from the template pulse train generator 100.

The pulse summer 734 performs the function in block 4 of FIG. 10. In general, the pulse summer 734 produces an increasing ramp function 30 or decreasing ramp function 31 as in FIG. 13 when the template pulse train provided by the template pulse train generator 100 aligns with the received impulse radio signal and otherwise produces a signal that is approximately equal to the summation of positive and negative random numbers or equal to a noise-like signal.

A threshold comparator 94 receives the output of the pulse summer 734 and performs the function of block 6 in FIG. 10. The output of the threshold comparator 94 is provided to a controller 99.

A lock loop filter 95 receives the output from the cross-correlator 710. The lock loop filter performs the same function as the lock loop filter 742 in FIG. 8. In addition, the lock loop filter 95 performs the function of block 7 in FIG.

10 and locks on the received impulse radio signal. The output of the lock loop filter 95 is provided to the controller 99.

A detector 96 receives the output from the pulse summer 734. The detector 96 performs the same function as detector 738 in FIG. 8. In addition, the detector 96 is coupled to a synchronization data memory 97 and a command data memory 98. The detector 96 is used to perform the synchronization check in block 10 using the synchronization data memory 97 and the command check in block 12 using the command data memory 98.

The controller 99 receives the outputs from the threshold comparator 94, the lock loop filter 95, and the detector 96. The controller 99 performs the quick check in block 8. In addition, the controller oversees the operation of the threshold comparator 94, the lock loop filter 95, and the detector 96.

As an option, the synchronization data memory 97 can be coupled to the controller 99, instead of to the detector 96. With this option, the controller 99 performs the synchronization check in block 10 using the synchronization data memory 97.

As an option, the command data memory 98 can be coupled to the controller 99, instead of to the detector 96. With this option, the controller 99 performs the command check in block 12 using the command data memory 98.

The system for FIG. 19 can be implemented with, for example, the following: circuitry; software and a microprocessor, a microcontroller, or similar device or devices; and any combination thereof.

The invention has been described as using counters, for example in FIGS. 15 and 16. As those skilled in the art will recognize, other techniques can be used for counting in addition to those specifically discussed here, and these other techniques are included within the scope of the invention.

The invention has been described as using a single correlator 710. As an option, the invention can be used with multiple correlators, vector modulation, flip modulation, and/or flip with shift modulation, such as those described in the following, which are incorporated herein by reference: U.S. patent application Ser. No. 09/537,264, concurrently filed, entitled "System and Method of Using Multiple Correlator Receivers in an Impulse Radio System;" U.S. patent application Ser. No. 09/538,519, concurrently filed, entitled "Vector Modulation System and Method for Wideband Impulse Radio Communications;" U.S. patent application Ser. No. 09/537,692, concurrently filed, entitled "Apparatus, System and Method for Flip Modulation in an Impulse Radio Communication System." With multiple correlators, one or more correlators can be used to detect data, and one or more correlators can be used to lock and acquire a received impulse signal, thereby decreasing the lock and acquisition period. With various modulation techniques, such as vector modulation, flip modulation, and/or flip with shift modulation, additional data states can be used, thereby increasing data speed.

The invention has been described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A method for detecting an impulse radio signal, comprising the steps of:
   (a) obtaining a template pulse train shifted by an offset;
   (b) obtaining a received impulse radio signal;
   (c) comparing the template pulse train and the received impulse radio signal to obtain a comparison result;
   (d) performing a threshold check on the comparison result; and
   (e) if the comparison result fails the threshold check, returning to step (a), and if the comparison result passes the threshold check, locking on the received impulse radio signal.

2. A method as in claim 1, wherein obtaining the template pulse train comprises shifting the template pulse train by the offset and by n lengths of the template pulse train, wherein n is a natural number and $1 \leq n$.

3. A method as in claim 2, wherein the offset is approximately ¼ of a wavelength of a pulse in the impulse radio signal.

4. A method as in claim 2, wherein the offset is greater than approximately a correlation time of a pulse in the impulse radio signal.

5. A method as in claim 2, wherein the offset is greater than approximately a wavelength of a pulse in the impulse radio signal.

6. A method as in claim 2, wherein the offset is greater than approximately a time between two pulses in the impulse radio signal.

7. A method as in claim 2, wherein the offset is determined by a fine step scanning process.

8. A method as in claim 2, wherein the offset is determined by a coarse step scanning process.

9. A method as in claim 2, wherein the offset is determined by a reverse binary scanning process.

10. A method as in claim 2, wherein the offset is determined by a random offset generating process.

11. A method as in claim 2, wherein the offset is determined by a conical scanning process.

12. A method as in claim 1, wherein comparing the template pulse train and the received impulse radio signal comprises correlating and summing the template pulse train and the received impulse radio signal to obtain the comparison result.

13. A method as in claim 1, wherein performing the threshold check comprises comparing the comparison result to a threshold.

14. A method as in claim 1, wherein the template pulse train has a length of approximately one data bit of the received impulse radio signal.

15. A method as in claim 1, wherein the template pulse train has a length greater than approximately one data bit of the received impulse radio signal.

16. A method as in claim 1, wherein the template pulse train has a length less than approximately one data bit of the received impulse radio signal.

17. A method as in claim 1, further comprising:
   (f) performing a quick check using the template pulse train and additional received impulse radio signal; and
   if the additional received impulse radio signal fails the quick check, returning to step (a).

18. A method as in claim 17, wherein performing the quick check comprises determining whether the template pulse train is aligned with the impulse radio signal via a repetition of steps (a)–(d).

19. A method as in claim 17, wherein performing the quick check comprises repeating steps (a)–(d) for the additional received impulse radio signal until the summation result is greater than or equal to the threshold in step (d) X times or until steps (a)–(d) are repeated Y times, whichever occurs first, wherein X and Y are natural numbers and 1≦X≦Y.

20. A method as in claim 17, wherein performing the quick check comprises:
   (f.1) shifting the template pulse train;
   (f.2) obtaining the additional impulse radio signal;
   (f.3) comparing the template pulse train and the additional impulse radio signal to obtain a comparison result;
   (f.4) performing a threshold check on the comparison result; and
   (f.5) repeating steps (f.1)–(f.4) until the comparison result passes the threshold check X times or until steps (f.1)–(f.4) are repeated Y times, whichever occurs first, wherein X and Y are natural numbers and 1≦X≦Y.

21. A method as in claim 17, wherein shifting the template pulse train comprises shifting the template pulse train by n lengths of the template pulse train, wherein n is a natural number and 1≦n.

22. A method as in claim 1, further comprising the step of:
   (g) performing a synchronization check of further received impulse radio signal; if the further received impulse radio signal fails the synchronization check, returning to step (a); and if the further received impulse radio signal passes the synchronization check, obtaining acquisition data comprising synchronization data and command data.

23. A method as in claim 22, wherein the synchronization check comprises comparing the synchronization data with stored synchronization data.

24. A method as in claim 22, wherein the synchronization check comprises locating a beginning of the acquisition data.

25. A method as in claim 22, wherein the synchronization check comprises the steps of:
   (g.1) obtaining an additional data bit of the impulse radio signal;
   (g.2) comparing Z latest data bits of the impulse radio signal to stored synchronization data, wherein Z is a natural number and 0<Z;
   (g.3) if the Z latest data bits of the impulse radio signal match the stored synchronization data, the further received impulse radio signal passes the synchronization check;
   (g.4) if the Z latest data bits of the impulse radio signal do not match the stored synchronization data and if steps (g.1)–(g.2) have been performed V times, the further received impulse radio signal fails the synchronization check, wherein V is a natural number and 1≦Z≦V; and
   (g.5) if the Z latest data bits of the impulse radio signal do not match the stored synchronization data, repeating steps (g.1)–(g.2).

26. A method as in claim 22, wherein the synchronization data comprises an error tolerant code.

27. A method as in claim 22, wherein the synchronization data comprises Stiffler code data.

28. A method as in claim 22, wherein the synchronization data has a length of approximately 32 data bits and the command data has a length of approximately 32 data bits.

29. A method as in claim 1, further comprising the step of:
   (h) performing a command check of command data of the impulse radio signal; if the command data fails the command check, returning to step (a); and if the command data passes the command check, acquiring the impulse radio signal.

30. A method as in claim 29, wherein performing the command check comprises comparing at least a portion of the command data of the impulse radio signal to stored command data.

31. A method as in claim 29, wherein the command data identifies at least one of a receiver receiving the impulse radio signal and a transmitter transmitting the impulse radio signal.

32. An apparatus for implementing the method of claim 1.

33. A method for detecting an impulse radio signal, comprising the steps of:
   (a) obtaining a template pulse shifted by an offset;
   (b) obtaining a received impulse radio signal;
   (c) comparing the template pulse train and the received impulse radio signal to obtain a comparison result;
   (d) performing a threshold check on the comparison result; and if the comparison result fails the threshold check, returning to step (a);
   (e) locking on the received impulse radio signal;
   (f) performing a quick check using the template pulse train and additional received impulse radio signal; and if the additional received impulse radio signal fails the quick check, returning to step (a);
   (g) performing a synchronization check of further received impulse radio signal; if the further received impulse radio signal fails the synchronization check, returning to step (a); and if the further received impulse radio signal passes the synchronization check, obtaining acquisition data comprising synchronization data and command data from the impulse radio signal; and
   (h) performing a command check of the command data; if the command data fails the command check, returning to step (a); and if the command data passes the command check, acquiring the impulse radio signal.

34. A system for detecting an impulse radio signal, comprising:
   means for obtaining a template pulse shifted by an offset;
   means for obtaining a received impulse radio signal;
   means for comparing the template pulse train and the received impulse radio signal to obtain a comparison result;
   means for performing a threshold check of the comparison result; and
   means for locking on the received impulse radio signal.

35. A system as in claim 34, wherein the system further comprises means for performing a quick check using the template pulse train and additional received impulse radio signal.

36. A system as in claim 34, wherein the system further comprises means for performing a synchronization check of further received impulse radio signal.

37. A system as in claim 34, wherein the system further comprises means for performing a command check of command data of the impulse radio signal.

38. A system for detecting an impulse radio signal, comprising:
   an antenna;
   a cross-correlator having an output, a first input, and a second input coupled to the antenna;
   a pulse summer having an output and an input coupled to the output of the cross-correlator;
   a detector having an output and an input coupled to the output of the pulse summer;

a threshold comparator having an output and an input coupled to the output of the pulse summer;

a lock loop filter having an output and an input coupled to the output of the cross-correlator;

a controller configured to shift a template pulse train by an offset, the controller having an output and an input coupled to the output of the detector, the output of the threshold comparator, and the output of the lock filter; and a template pulse train generator having an output coupled to the first input of the cross-correlator and having an input coupled to the output of the controller.

39. A system as in claim 38, wherein the controller performs a quick check of the impulse radio signal received by the antenna.

40. A system as in claim 38, further comprising a synchronization data memory coupled to the detector.

41. A system as in claim 38, wherein the detector performs a synchronization check of the impulse radio signal received by the antenna.

42. A system as in claim 38, further comprising a synchronization data memory coupled to the controller.

43. A system as in claim 38, wherein the controller performs a synchronization check of the impulse radio signal received by the antenna.

44. A system as in claim 38, further comprising a command data memory coupled to the detector.

45. A system as in claim 38, wherein the detector performs a command check of the impulse radio signal received by the antenna.

46. A system as in claim 38, further comprising a command data memory coupled to the controller.

47. A system as in claim 38, wherein the controller performs a command check of the impulse radio signal received by the antenna.

48. A system as in claim 38, wherein the template pulse train generator generates a template pulse train and provides the generated template pulse train to the cross-correlator.

49. A method for detecting an impulse radio signal, comprising the steps of:

(a) obtaining a template pulse train shifted by an offset;

(b) obtaining a received impulse radio signal; and (c) performing a quick check using the template pulse train and the received impulse radio signal; and if the received impulse radio signal fails the quick check, returning to step (a).

50. A method for detecting an impulse radio signal, comprising the steps of:

(a) obtaining a received impulse radio signal; and (b) performing a synchronization check of the received impulse radio signal; if the received impulse radio signal fails the synchronization check, returning to step (a); and if the received impulse radio signal passes the synchronization check, obtaining acquisition data comprising synchronization data and command data.

51. A method for detecting an impulse radio signal, comprising the steps of:

(a) obtaining the impulse radio signal having command data; and (b) performing a command check of command data of the impulse radio signal; if the command data fails the command check, returning to step (a); and if the command data passes the command check, acquiring the impulse radio.

* * * * *